June 9, 1925.

J. MISENER

FORK

Filed Oct. 24, 1923

Justus Misener,
INVENTOR

BY Victor J. Evans
ATTORNEY

WITNESS: J. T. L. Wright

June 9, 1925. 1,541,730
J. MISENER
FORK
Filed Oct. 24, 1923 2 Sheets-Sheet 2
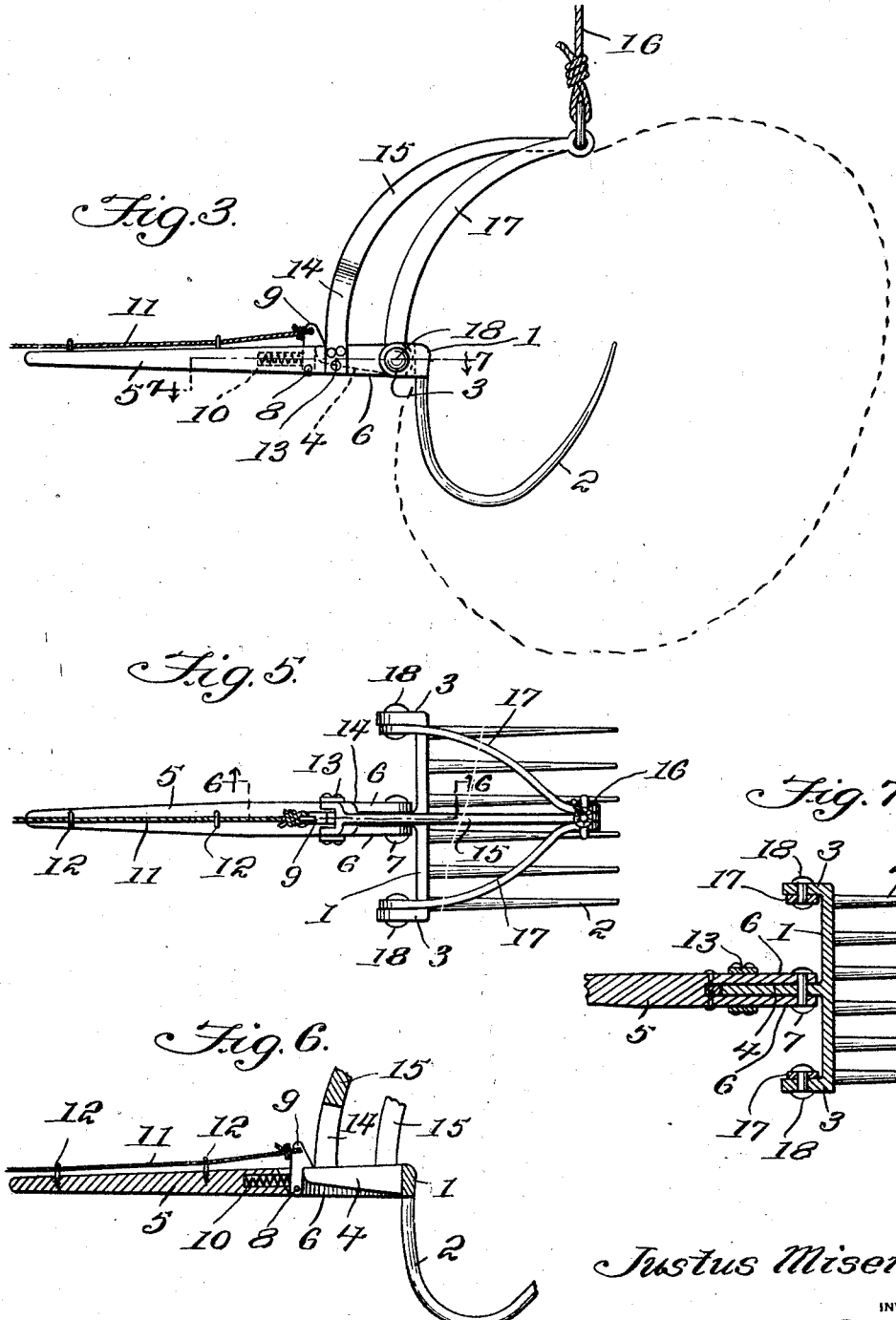
Justus Misener
INVENTOR
BY Victor J. Evans
ATTORNEY
J. T. L. Wright
WITNESS:

Patented June 9, 1925.

1,541,730

UNITED STATES PATENT OFFICE.

JUSTUS MISENER, OF BAY CITY, MICHIGAN.

FORK.

Application filed October 24, 1923. Serial No. 670,523.

*To all whom it may concern:*

Be it known that I, JUSTUS MISENER, a citizen of the United States, residing at Bay City, in the county of Bay and State of Michigan, have invented new and useful Improvements in Forks, of which the following is a specification.

This invention relates to hay forks of the character designed for mowing hay in barns, and has for an object to produce a device of this character in which the rake is latched in closed position and readily unlatched when the load has been conveyed to the dumping place.

A further object is to produce a device of this class, characteristic of simplicity in construction, coupled with ease, accuracy and efficiency in operation.

With these and other objects in view this invention will be better understood from the following detailed description taken in connection with the accompanying drawings wherein:

Figure 3 is a similar view showing the fork in locked position.

Figure 5 is a top plan view of the device in closed position.

Figure 6 is a sectional view approximately on the line 6—6 of Figure 5.

Fig. 7 is a sectional view on line 7—7, Fig. 3.

Figure 1:
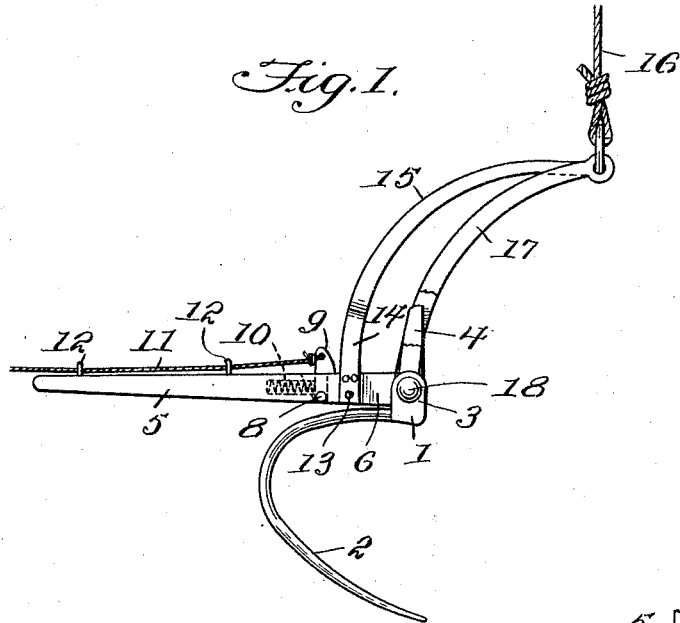
Figure 1 is a side elevation of the improvement, the fork being in open position.

The fork includes a head 1 to which are connected the tines 2. The tines are extended approximately in a line parallel to that of the flat head 1 and are from thence rounded upon themselves and extended at an outward curvature therefrom. The head 1 is in the nature of a metal plate or casting and has its ends formed with right angular extensions in the nature of ears 3. The ears extend in the same direction. Formed centrally on the head there is a tongue 4 which extends in the same direction as the ears 3.

The supporting frame for the fork includes a stem 5 having an inner bifurcated end between the arms 6 of which the tongue 4 is pivoted, as at 7. The pivot 7 is arranged near the juncture of the tongue 4 with the head 1.

Pivotally secured between the arms 6 of the stem 5, as at 8, there is a dog 9 influenced by a spring 10 to engage with the tongue 4 when the latter is received in the space between the arms 6 and aranged parallel with said arms. Connected to the dog 9 there is a flexible element 11 that is trained through guide eyes 12 on the stem 5.

Secured, as at 13, to the arms 6 of the stem 5 there is the forked end 14 of an outwardly arched bar 15. To the bar 15 the suspending rope 16 is attached. Pivotally secured, as at 17, to the outer end of the supporting bar 16 are the straight ends of outwardly rounded plates 17, the said plates being pivoted, as at 18 to the respective ears 3 of the head 1 of the fork.

Figure 2:
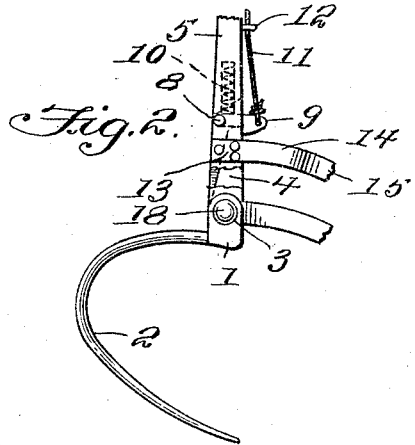
Figure 2 is a similar view showing the manner in which the frame of the device is moved to lock the fork thereto.
Figure 4:
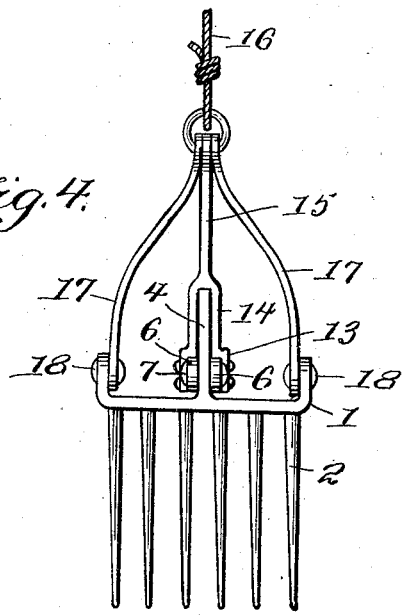
Figure 4 is a front elevation of the improvement in open position.

In operation, the fork is swung to open position, as disclosed in Figure 1 of the drawings. The fork and the supporting frame therefor are lowered so that the pointed ends of the tines will enter the hay to be gathered. Because of the outwardly extending elements 15 and 17, the weight thereof may be sufficient to swing the shank 5 on its pivot 7 to bring the tongue between the arms 6 thereof into engagement by the latching dog 9, but an operator may swing the frame in a downward direction with respect to the fork, as indicated in Figure 2 of the drawings. A further movement of the frame will cause the tongue to be swung between the arms 6 and engaged by the dog 9, and when this occurs the supporting rope 16 is drawn taut so that the device assumes the position illustrated in Figure 3. The arched plates 17 in connection with the tines of the fork afford an effective cradle for the hay gathered therebetween. The rope 16 is trained over suitable pulleys on the usual track so that the fork is conveyed to the place where the hay is to be dumped. When so positioned a pull is exerted upon the rope 11 to unlatch the dog 9 and release the tongue 4 when the weight of the hay on the fork will cause the same to swing to the position illustrated in Figure 1.

While I have illustrated a satisfactory embodiment of my improved device, my features of invention are capable of extended application, and I do not wish to be limited to the specific structure shown and described.

Having described the invention, I claim:—

A hay fork having its head formed with a rearwardly extending tongue and its ends formed with rearwardly extending ears, a stem having a bifurcated end receiving the tongue, a pivot connecting the stem with the tongue, a spring influenced dog carried by the stem engageable with the tongue for holding the latter in alignment with the stem and the fork in closed position, a flexible releasing element for the dog, an outwardly curved member having a forked inner end which is secured to the sides of the stem and which projects beyond the outer face of the frame for the fork, a supporting rope attached to said member, and oppositely rounded plates having their ends secured respectively to the ends of the mentioned member and to the ears of the fork head.

In testimony whereof I affix my signature.

JUSTUS MISENER.